United States Patent [19]

Cozewith

[11] Patent Number: 5,191,042
[45] Date of Patent: Mar. 2, 1993

[54] PROCESS FOR PREPARING ALPHA-OLEFIN COPOLYMERS HAVING A NARROW MWD AND BROAD COMPOSITIONAL DISTRIBUTION

[75] Inventor: Charles Cozewith, Watchung, N.J.

[73] Assignee: Exxon Chemical Patents Inc., Linden, N.J.

[21] Appl. No.: 767,523

[22] Filed: Sep. 25, 1991

Related U.S. Application Data

[63] Continuation of Ser. No. 403,953, Sep. 6, 1989, abandoned.

[51] Int. Cl.$^5$ .................. C08F 2/04; C08F 236/20
[52] U.S. Cl. ...................... 526/144; 526/169.2; 526/281; 526/282; 526/336
[58] Field of Search ............. 526/144, 169.2, 282, 526/336, 281

[56] References Cited

U.S. PATENT DOCUMENTS

| | | | |
|---|---|---|---|
| 3,000,866 | 9/1961 | Tarney | 260/80.5 |
| 3,301,834 | 1/1967 | Christman | 260/80.5 |
| 3,349,064 | 10/1967 | Gumboldt et al. | 260/80.7 |
| 3,489,729 | 1/1970 | Kahle et al. | 260/80.78 |
| 4,540,753 | 9/1985 | Cozewith et al. | 526/88 |

FOREIGN PATENT DOCUMENTS

| | | |
|---|---|---|
| 602542 | 6/1959 | South Africa . |
| 902385 | 8/1962 | United Kingdom . |
| 1005282 | 9/1965 | United Kingdom . |
| 1059865 | 2/1967 | United Kingdom . |

OTHER PUBLICATIONS

*Liquid Chromatography of Polymers and Related Materials III*, J. Cazes editor, Marcel Dekker, 1981, 207–235.
*Journal of the American Chemical Society*, 95, 4158–4162 (1973), T. A. Cooper.

*Primary Examiner*—Fred Teskin
*Attorney, Agent, or Firm*—W. G. Muller; J. E. Schneider

[57] ABSTRACT

The present invention is directed toward novel copolymers of ethylene and at least one other alpha-olefin monomer which copolymers have an intermolecular compositional distribution (CD), such that at least about 25% by weight of the polymer differs from the mean ethylene content of the polymer by at least plus or minus 5 wt % ethylene and a relatively narrow molecular weight distribution (MWD) such that the weight average molecular weight (Mw) of the polymer divided by the number average molecular weight (Mn) by the polymer is not greater than about 5.0.

The polymers of this invention, which are characterized by exceptional green strength and good processing properties, may be prepared using a catalyst system comprising:
a) a vanadium compound with a valence of 3 or more;
b) a triorgano aluminum compound; and
c) a specific halogenated organic promoter used in catalytic amounts.

The catalyst system allows for efficient polymerization of high quality polymer products and at generally higher polymerization temperatures of up to about 140° C. to yield higher molecular weight polymer products which are essentially free of gel, and which possess excellent green strength and processability.

26 Claims, 1 Drawing Sheet

FIG. 1

PROCESS FOR PREPARING ALPHA-OLEFIN COPOLYMERS HAVING A NARROW MWD AND BROAD COMPOSITIONAL DISTRIBUTION

This is a continuation, of application Ser. No. 403,953, filed Sep. 6, 1989, now abandoned.

BACKGROUND OF THE INVENTION

1. Field of the Invention

This invention is directed toward novel alpha olefin copolymers having a narrow molecular weight distribution (MWD) and a broad compositional distribution (CD), and a process for making ame.

2. Description of Related Art

Ethylene-propylene copolymers, particularly elastomers, are important commercial products. Two basic types of elastomeric ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin , such as dicyclopentadiene, 1,4-hexadiene or ethylidene norbornene, which provides sufficient unsaturation to permit vulcanization with sulfur. Such polymers that include at least two monomers, i.e. EPM and EPDM, will hereinafter be collectively referred to as copolymers.

These elastomeric copolymers have outstanding resistance to weathering, good heat aging properties and the ability to be compounded with large quantities of fillers and plasticizers resulting in low cost compounds which are particularly useful in automotive and industrial mechanical goods applications. Typical automotive uses are tire sidewalls, inner tubes, radiator and heater hose, vacuum tubing, weather stripping and sponge doorseals and Viscosity Index (V.I.) improvers for lubricating oil compositions. Typical mechanical goods uses are for appliance, industrial and garden hoses, both molded and extruded sponge parts, gaskets and seals and conveyor belt covers. These copolymers also find use in adhesives, appliance parts as in hoses and gaskets, wires and cable and plastics blending.

As can be seen from the above, based on their respective properties, elastomeric EPM and EPDM copolymers find many and varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" cross-links per peroxide molecule increase. Ethylene content also influences the rheological and processing properties, because crystallinity can be introduced. The crystallinity present at very high ethylene contents may hinder processibility and may make the cured product too "hard" at temperatures below the crystalline melting point to be useful as a rubber.

The properties of EPM and EPDM copolymers are a function of the catalyst system and polymerization process used to produce them. Elastomeric olefin copolymers may be produced at relatively low polymerization temperatures and pressures by means of the so called Ziegler catalysts which comprise a transition metal compound used in combination with a metal alkyl. More specifically, catalyst systems based on a combination of a vanadium compound, an aluminum alkyl or aluminum alkyl halide and, in some cases, a halogen-containing organic compound which serves as a polymerization promoter are known in the art.

For example, U.S. Pat. No. 4,540,753 relates to ethylene copolymers with narrow molecular weight distribution (MWD) and a narrow intermolecular composition distribution (Inter-CD). The catalyst system used in this reference comprises a hydrocarbon-soluble vanadium compound having the formula:

and an organo-aluminum compound. In the polymerization process, the catalyst components are premixed in the premixing device and aged for 1–50 seconds. The inlet temperature of the reaction mixture is about $-50°$ to $150°$ C.

As pointed out in the above mentioned U.S. Pat. No. 4,540,753, Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number for example 15% Inter-CD, it shall mean the larger of the positive or negative deviations. For example, for a Gaussian compositional distribution, 95.5% of the polymer is within 20 wt.% ethylene of the mean if the standard deviation is 10%. The Inter-CD for 95.5 wt.% of the polymer is 20 wt.% ethylene for such a sample.

G.B. Patent 902,385 teaches a process of preparing a copolymer of ethylene and higher 1-olefin that is essentially homogeneous as to its composition using a catalyst system based on $VOY_n$ and $AlR_3$ where Y is alkoxide or acetyacetonate group, and n is 2 or 3, and R is a hydrocarbon radical. A mixture of carbon tetrachloride and an inert organic liquid solvent or carbon tetrachloride alone is used as the solvent for the copolymerization reaction. Temperature is within the range of from $0°$ C. to $125°$ C., more preferably from $25°$ C. to $80°$ C. A molar ratio of Al/V is from 3 to 8.

U.S. Pat. No. 3,000,866 teaches ethylene copolymers with about 20% ethylene units by weight and at least 25% alpha-olefin units by weight and about 0.5% to 10% of dicyclopentadiene units by weight. The catalyst system used in this disclosure is made by mixing vanadium tetrachloride or vanadium oxytrichloride with $(R)_3Al$ or $(R)_2AlX$. The polymerization is conducted by contacting ethylene and dicyclopentadiene in a solution of tetrachloro ethylene with the said catalyst system at temperatures between about $20°$ C. to $100°$ C.

GB Patent 1,005,282 relates to a catalyst system such as vanadium or chromium acylacetonate, vanadyl diacylacetonate, and vanadyl alkyl orthovanadate and a halogen-free metal organic compound such as aluminum trialkyl or aluminum alkenyl for the preparation of linear head-to-tail high molecular weight homopolymers of alpha-olefin having the general formula R—CH=CH$_2$. The polymerization is carried out in the presence of a halogenated hydrocarbon compound such as chloroform, methylene chloride or a mixture thereof. The polymerization is carried out at temperatures of from −80° C. to +125° C.

U.S. Pat. No. 3,301,834 relates to a process for the polymerization of ethylene and for the copolymerization of ethylene with other ethylenically unsaturated hydrocarbons. The catalyst system comprising vanadium compounds (VOCl$_3$ or VCl$_4$) and organoaluminum compounds is formed in the presence of a halogenated compound such as benzotrichloride. The ratio of halogenated compound to vanadium compound is preferably from 10:1 to 100:1. The molar ratio of V/Al generally is 1:3 to 1:30, but higher ratios up to 1:3000 are disclosed to be operable. The polymerization temperature range is from room temperature to about 150° C.

U.S. Pat. No. 3,349,064 also relates the same catalyst system as that defined in U.S. Pat. No. 3,301,834 except that the halogenated promoter is a group of unsaturated carboxylic compounds containing at least 4 halogen atoms, at least 2 of which are attached to doubly bonded carbon atoms and at least 1 of which is attached to a singly bonded carbon atom alpha to the double bond (e.g., 2, 2, 3, 4, 5, 5-hexachlorocyclopentene). The use of VCl$_4$, TEA and hexachlorocylocpentadiene is described in example 6. The molar ratio of promoter to vanadium compound is preferably from 10:1 to 100:1. The molar ratio of V/Al is 1:3 to 1:30; 1:60 is disclosed to be operable.

U.S. Pat. No. 3,489,729 relates to a method of making EPDM polymer by using the catalyst system comprising R$_3$Al organo-aluminum compounds and vanadium compounds having formula VOY$_n$, together with halogen-containing compounds such as hydrogen chloride, elemental chlorine, benzyl chloride, or t-butyl chloride. The temperature for the polymerization is −100° to 200° F. The molar ratio of organoaluminum compound to vanadium compound is in the range of 3/1 to 20/1. The amount of active halogen-containing compound based on vanadium compound is 1 to 30 mols per mol of vanadium compound.

BE Patent 592,247 teaches a process for preparing copolymer of ethylene with alpha-olefins whose molecular weight depends on the amount of halogenated alkanes used. Triisobutyl aluminum ([(CH$_3$)$_2$CH$_2$]$_3$Al), vanadium tetrachloride (VCl$_4$) and carbon tetrachloride (CCl$_4$) may be used as a catalyst system.

GB Patent 1,059,865 relates to the polymerization of ethylene, or ethylene together with one or more olefin monomers. TEA, CCl$_4$, CHCl$_3$, and vanadium di-isopropyl salicylate are used as the catalyst system.

The breadth of the intermolecular compositional distribution (CD) and molecular weight distribution (MWD) of polymers such as prepared by the above referenced disclosures are largely a function of the particular catalyst system employed to prepare the polymer. Such catalyst systems generally yield polymer with either narrow CD and narrow MWD or broad CD and broad MWD. Until the present invention, ethylene copolymers (EPM or EPDM) having a broad CD and at the same time a narrow MWD are not believed to have been disclosed in the art. Such elastomers are especially useful in that they possess novel combinations of properties such as excellent green strength and processability which leads to superior performance in a number of applications.

SUMMARY OF THE INVENTION

The present invention is directed toward novel elastomeric copolymers of ethylene and at least one other alpha-olefin monomer which copolymers have an intermolecular compositional distribution (CD), as hereinafter defined, such that at least about 25% by weight of the polymer differs from the mean ethylene content of the polymer by at least plus or minus 5 wt % ethylene, and have a relatively narrow molecular weight distribution (MWD) such that the weight average molecular weight (Mw) of the polymer divided by the number average molecular weight (Mn) of the polymer is not greater than about 5.0.

The copolymers of this invention which are characterized by exceptional green strength and good processing properties, may be prepared using a catalyst system comprising:
a) a vanadium compound with a valence of 3 or more;
b) a triorgano aluminum compound; and
c) a specific halogenated organic promoter used in catalytic amounts.

The catalyst system allows for efficient polymerization of high quality polymer products and at generally higher polymerization temperatures of up to about 140° C. to yield higher molecular weight polymer products which are essentially free of gel, and which possess excellent green strength and processability.

DETAILED DESCRIPTION OF THE INVENTION

Figure 1:
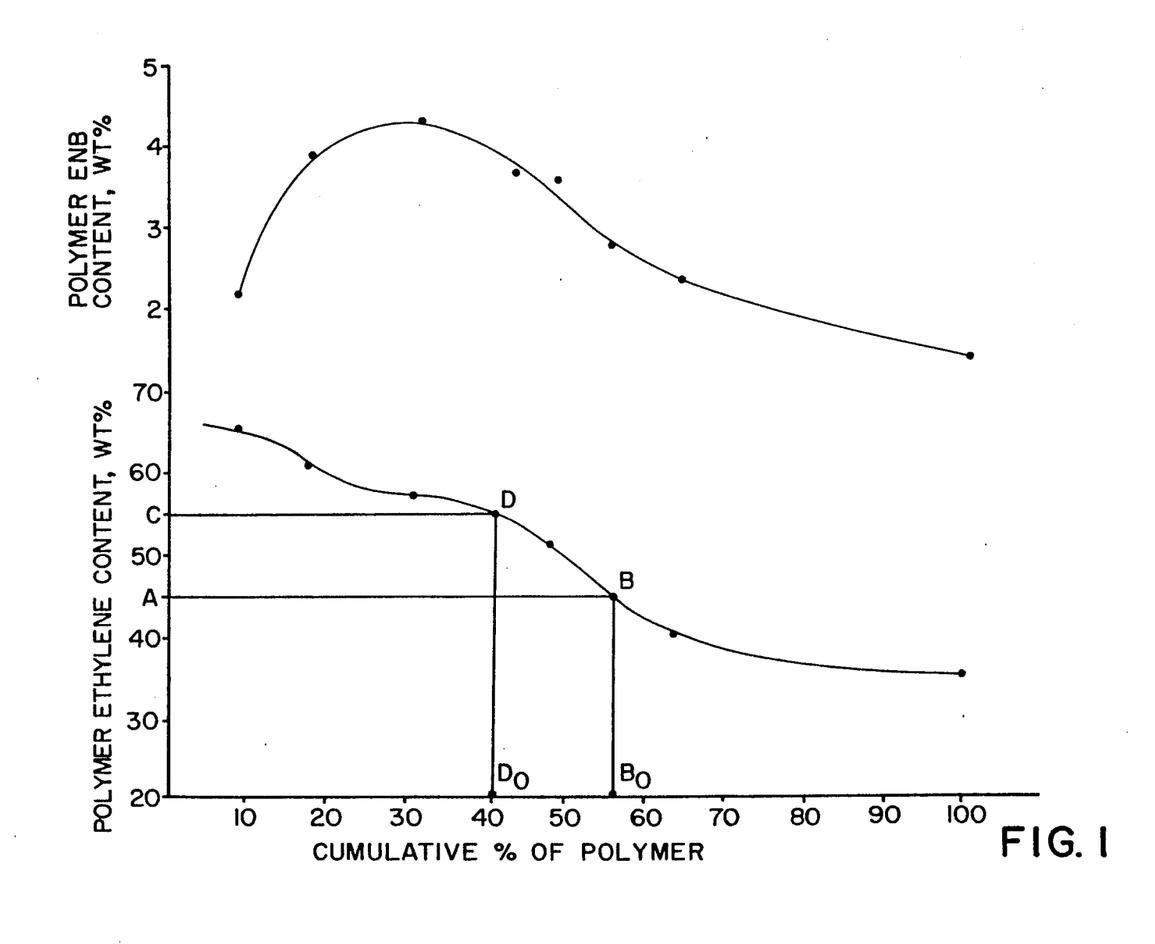
FIG. 1 is a graph showing polymer compositional distribution based on mean monomer content of polymerized ethylene.

The term intermolecular compositional distribution (CD) as used herein defines the compositional variation among polymer chains in terms of ethylene content as compared with the mean ethylene content of the copolymer as a whole. The CD is expressed by first determining the mean ethylene content of the copolymer sample by a suitable test such as described in ASTM D-3900. Next, the copolymer sample is dissolved in solvent such as hexane and a number of fractions of differing composition are precipitated by the addition of incremental amounts of a liquid such as isopropanol in which the copolymer is insoluble. Generally, from about 4–6 fractions are precipitated in this way and the weight and ethylene content of each fraction are determined after removing the solvent. From the weight of each fraction and its ethylene content, a plot is prepared of weight percent composition vs. cumulative weight percent of polymer which is shown in FIG. 1, and a smooth curve is drawn through the points. The ethylene composition corresponding to 50% by weight of the polymer is located as shown by the construction in the figure, and horizontal lines A–B and C–D are drawn at ±5 weight percent ethylene from the mean composition. Vertical lines through points B and D are drawn to locate points B$_o$ and D$_o$ respectively at the horizontal base axis, and if the cumulative percent of polymer represented by B$_o$ minus D$_o$ is 75% or less, then the polymer falls within the scope of this invention. For example, with the data shown in FIG. 1, the mean composition of the copolymer as a whole is 50 weight percent ethylene, D$_o$ is about 41 cumulative %, B$_o$ is about 56 cumulative %, and B$_o$ minus D$_o$ is therefore about 15%. Thus, with respect to a copolymer as represented in FIG. 1, about 85% of the copolymer has an ethylene content which is greater by plus or minus 5% than the mean ethylene content of 50% of the copolymer as a whole. This exemplifies a b road compositional distribution within the scope of this invention.

Molecular weight distribution (MWD) is a measure of the range of molecular weights within a given copolymer sample. It is characterized as a ratio of weight average to number average molecular weight, i.e. Mw/Mn. MWD can be measured by gel permeation chromotography (GPC), for instance, using a Waters 150 gel permeation chromatograph equipped with a Chromatix KM-6 on-line light scattering photometer. The system is used at 135.C with 1,2,4 trichlorobenzene as mobile phase. Showdex (Showa-Denko America, Inc.) polystyrene gel columns 802, 803 804 and 805 are used. This technique is discussed in "Liquid Chromatography of Polymers and Related Materials III", J. Cazes editor, Marcel Dekker, 1981, p. 207, which is incorporated herein by reference. No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on Mw/Mn or Mz/Mw are less than 0.05 unit. Mw/Mn is calculated from an elution time-molecular weight relationship whereas Mz/Mw is evaluated using the light scattering photometer. The numerical analyses can be performed using the commercially available computer software GPC2, MOLWT2 available from LDC/Milton Roy-Riviera Beach, Florida. The low molecular weight cut off for the calculation is 1500-2000.

The elastomeric polymer of this invention comprises ethylene-containing elastomeric polymers that have been copolymerized with one or more higher alpha olefins and optionally a diene monomer. As applied to polymers of this invention, the terms "elastomeric" or "elastomer" are defined to mean that when they are crosslinked, they are capable of recovering from large deformations quickly and forcibly. Free from diluents, the crosslinked polymers retract within one minute to less than 1.5 times their original lengths after being stretched at 18° C.-29° C. to twice their lengths and held for one minute before release.

Typically elastomers are "substantially amorphous", and when that term is used to define the ethylene containing elastomeric polymers of this invention, it is to be taken to mean having a degree of crystallinity less than 25%, preferably less than about 15%, and more preferably less than about 10% as measured by means known in the art. The three major known methods of determining crystallinity are based on specific volume, x-ray diffraction, and infrared spectroscopy. Another well-established method, based on measurement of heat content as a function of temperature through the fusion range, is differential scanning calorimetry. It is known that these independent techniques lead to good experimental agreement.

Additionally, it is known in the art that the tendency of a particular combination of catalyst system and monomers to produce blocky, random, or alternating monomer sequence distribution in the polymer can be characterized by the product of the reactivity ratios defined for the given monomers under the specific reaction conditions encountered. If this product is equal to 1.0, the sequence distribution will be perfectly random; the more the product is less than 1.0, the more the monomers will approach alternating sequence; and, the more the product is greater than 1.0, the more the monomers will tend to have a blocky sequence distribution. Generally speaking, the segments of a polymer which crystallize are linear segments which have a number of identical (both by chemical make-up and stereo-specific orientation) units in a row. A combination of such segments are said to yield blocky polymer. If there is little or no such sequential order within the segments making up a polymer chain, that chain will be very unlikely to conform itself into the correct shape to fit into the spatial order of a crystal and will accordingly exhibit a low degree of crystallinity. The ethylene-containing elastomeric polymers of this invention, accordingly, have a reactivity ratio product less than 2.0, preferably less than about 1.5, and more preferably less than about 1.25, and are substantially amorphous.

As already noted, copolymers in accordance with the present invention are comprised of ethylene and at least one other copolymerizable alpha-olefin. Such alpha-olefins include those containing 3 to 18 carbon atoms, e.g., propylene, butene-1, pentene-1, hexene-1, etc. Alpha-olefins of 3 to 6 carbons are preferred due to economic considerations, and they are generally present in the copolymer within the range of about 10 to 90 percent by weight, more preferably from about 15 to about 70 percent by weight most preferably 20 to about 70 percent by weight. The most preferred copolymers in accordance with the present invention are those comprised of ethylene and propylene or ethylene, propylene and a diene.

As is well known to those skilled in the art, copolymers of ethylene and higher alpha-olefins such as propylene often include other copolymerizable monomers. Typical of these other monomers may be non-conjugated dienes such as the following non-limiting examples:

a straight chain acyclic dienes such as 1,4-hexadiene; 1,6-octadiene;

b branched chain acyclic dienes such as 5-methyl-1, 4-hexadiene; 3,7-dimethyl-1, 6-octadiene; 3,7-dimethyl -1,7-octadiene and the mixed isomers of dihydro-myrcene and dihydroocinene;

c single ring alicyclic dienes such as: 1,4-cyclohexadiene; 1,5-cyclooctadiene; and 1,5-cyclododecadiene;

d multi-ring alicyclic fused and bridged ring dienes such as: tetrahydroindene; methyltetrahydroindene; dicyclopentadiene; bicyclo-(2,2,1)-hepta2,5-diene; alkenyl, alkylidene, cycloalkenyl and cycloalkylidene norbornenes such as 5-methylene-2-norbornene (MNB), 5-ethylidene-2 -norbornene (ENB), 5 -propyl-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the the copolymer may be from about 0% to 20% with 0% to 15% being preferred. The most preferred range is 0% to 10%. Where the diene is present, it is generally present at a minimum level of about 1 weight percent.

As already noted, the most preferred copolymer in accordance with the present invention is ethylenepropylene or ethylene-propylene-diene. In either event, the average ethylene content of the copolymer may be as low as about 10% on a weight basis. The preferred minimum is about 25%. A more preferred minimum is about 30%. The maximum ethylene content may be about 90% on a weight basis. The preferred maximum is about 85%, with the most preferred being about 80%.

A further unexpected characteristic of the copolymer of this invention is the broad compositional distribution of the optionally included non-conjugated diene. As is known in the art, copolymer having typically narrow MWD will also be expected to have a narrow compositional distribution of non-conjugated diene. The copolymer of this invention containing non-conjugated diene will thus exhibit a compositional distribution such that the diene content of at least about plus or minus 20% of the polymer differs from the mean value of incorporated non-conjugated diene by at least plus or minus 0.5 weight percent diene. A typical curve representing this compositional distribution appears in the upper portion of FIG. 1.

The molecular weight of copolymer made in accordance with the present invention can vary over a wide range. The preferred minimum is about 10,000. The most preferred minimum is about 20,000. The maximum weight average molecular weight may be as high as about 12,000,000. The preferred maximum is about 1,000,000, with the most preferred maximum being about 750,000.

Copolymers prepared in accordance with the present invention exhibit a broad CD with at least about 25% of the polymer differing from the mean ethylene content by $\pm 5\%$ ethylene, and a relatively narrow molecular weight distribution within the range of from about 2 to 5, evaluated as described above. Copolymers having the most superior green strength and processing properties are those having a CD breadth ranging from about 40% to about 80% of the polymer differing from the mean ethylene content by $\pm 5\%$ and $(M_w/M_n)$ of from greater than about 2.0 up to about 4.5.

As indicated above, the novel copolymers of this invention are produced using a catalyst system comprising:
a) a hydrocarbon soluble, non-supported vanadium compound with a valence of three or more;
b) a triorgano aluminum compound; and
c) a specific halogenated organic promoter used in catalytic amounts.

The vanadium component of the catalyst system may have the general formulas wherein X is halogen, preferably chlorine, and Y is an organic substituent selected from the group consisting of an alcoholate, carboxylate, ketonate or diketonate having up to 10 carbon atoms, a and b may range from 0 to 3 with the proviso that the sum of a and b is 2 or 3, and c and d may range from 0 to 4 with the proviso that the sum of c and d is 3 or 4. Preferred vanadium compounds for the purposes of this invention include:

wherein R is a hydrocarbon radical preferably having from about 1 to 10 carbon atoms. R preferably represents an aliphatic, alicyclic or aromatic hydrocarbon radical such as ethyl (Et), phenyl, isopropyl, butyl (Bu), propyl, n-butyl, i-butyl, t-butyl, hexyl, cyclohexyl, octyl, naphthyl and so forth. Non limiting and illustrative examples of preferred vanadium compounds are vanadyl tetrahalides and trihalides, alkoxy halides and alkoxides, such as $VCl_4$, $VOCl_3$, $VOCl_2(OEt)$, $VOCl_2(OBu)$, $VO(OBu)_3$ and $VO(OC_2H_5)_3$. The most preferred vanadium compounds are the chlorinated compounds such as $VOCl_3$, $VCl_4$ and $VOCl_2(OR)$.

The triorgano aluminum component of the catalyst system has the formula $AlR_3$ wherein R is a hydrocarbon radical having one to ten carbon atoms as defined above with respect to the vanadium compounds. Examples of suitable R groups include methyl, ethyl, i-butyl, hexyl and phenyl. Preferred compounds are trialkyl aluminum compounds, including triethyl, tri isobutyl and tri n-hexyl aluminum. It is important for the purposes of this invention that the aluminum compound is free of halogen, i.e., that aluminum alkyl halides not be used. Catalytic activity is markedly reduced using these latter compounds.

The selection of the proper halogenated polymerization promoter is a key feature of the present invention. A certain range of halogen substituent reactivity toward the catalyst is required to give the proper balance of catalyst activity and properties of the copolymer product. If the reactivity is too low, catalyst efficiency is reduced, while if it is too high, undesirable side reactions occur which are deleterious to catalyst performance. Cooper (T. A Cooper, *Journ. Am. Chem. Soc.*, 4158 (1973), the disclosure of which is incorporated herein by reference, has defined in Table 1 an organic halide activity index based on the ability of the halide to oxidize $VCl_2$ $(py)_4$ to $V(III)$ under standard conditions. For example, $CCl_4$ is assigned a reactivity of 1 in tetrahydrofuran at 20° C., and other listed halogenated organic compounds have reactivities of from about 0.02 to greater than 200 relative to $CCl_4$.

It has been found that organic halides as defined in the above referenced article with a Cooper Index ranging from about 0.01 up to about 30 are suitable promoters for the purposes of this invention. Most preferred promoters meeting this criteria are selected from the group consisting of carbon tetrachloride, hexachloroethylene, benzylbromide, benzylchloride and 2,3- or 1,3-dichloropropylene.

It is important that the vanadium component of the catalyst system is both not hydrocarbon insoluble and not supported on an inert or hydrocarbon insoluble support. Vanadium Catalyst systems that are hydrocarbon insoluble or deposited on inert supports are not typically useful for the preparation of elastomeric copolymers of ethylene according to the procedures of this invention.

The polymerization in accordance with this invention may be carried out either in solution or in suspension, but solution polymerization is preferred to avoid problems of reactor fouling. The process may be carried out as a batch process or a continuous process, although continuous flow stirred tank reactors are preferred, and at normal atmospheric pressure or under elevated or reduced pressures. The polymerization may also be carried out using a series of two or more continuous flow stirred tank reactors or equivalents thereof. Normally, pressures of 1-10 atmospheres are preferred. The polymerization may be carried out at temperatures in the range of about 60° to about 140° C., as well as the more common temperatures within the range of about 10° to 60° C. When the polymerization is conducted at the higher range of about 55° C. to 140° there is additional process advantage in that the energy requirements for both recovering the polymer from solution and cooling the react or during polymerization are reduced. Preferred polymerization temperatures for the purposes of this invention lie in the range of from about 40° to 120° C., more preferably from about 55° to 100° C. Solvents used in the process include one or a mixture of hydrocarbons such as pentane, hexane, benzene, toluene, xylene, cyclo hexane and the like. Diluents useful for a suspension process are propane, butane or a mixture of the liquefied monomers useful in accordance with this invention. Preferably, but not necessarily, the solvent will also be a solvent for the vanadium catalyst compound. The polymerization reaction should be conducted in the absence of oxygen, carbon dioxide, water and other materials which have a deleterious effect on the catalyst activity.

The catalyst and halogenated promoter may be combined prior to contact with the monomers, or dilute solutions of these components may be introduced separately into the reactor. It is preferred for the purposes of this invention that the vanadium catalyst and alkyl aluminum are introduced separately into the reactor and allowed to react to form the active catalyst in the presence of the monomers, since catalyst activity may suffer if the catalyst components are premixed. Also, it is preferable not to premix the promoter and alkyl aluminum since undesirable side reactions might occur.

Polymer molecular weight may be controlled by the introduction of known chain transfer agents such as hydrogen gas or diethyl zinc. In general, the quantity of chain transfer agent introduced into the reactor ranges from about 0.1 to about 100 moles per mole of vanadium catalyst. In some cases it may also be desirable to add known chain branching suppressors, including Lewis Bases such as $NH_3$, pyridine and $Si(OEt)_4$ to the reactor along with the catalyst components. The preferred molar ratio of such suppressors ranges from about 1:2 to 10:1 with respect to the quantity of the vanadium catalyst employed.

The average residence time of the reactants in the reactor generally ranges from about 5 minutes to about 2 hours or more.

Following polymerization, the polymer product can be conventionally recovered from the effluent by coagulation with a nonsolvent such as isopropyl alcohol or n-butyl alcohol, acetone, or the polymer can be recovered by stripping the solvent with heat or steam. An antioxidant can be incorporated in the polymer during the recovery procedure, such a s phenyl-beta-naphthylamine; di-tert-butylhydroquinone, triphenyl phosphite, heptylated diphenylamine, 2,2'-methylene-bis (4-methyl-6-tert-butyl)phenol, and 2,2,4-trimethyl-6-phenyl-1,2-dihydroquinoline.

The amount of the vanadium catalyst employed in the present invention is relatively low as compared with prior art processes not employing a promoter. In general, the amount of vanadium catalyst ranges from about 0.02 to about 0.5 millimoles per liter of solvent solution, with levels of from about 0.05 to about 0.5 millimoles being most preferred.

For best catalytic performance, the molar amounts of vanadium catalyst and aluminum compound added to the reaction medium should provide a molar ratio of aluminum to vanadium (Al/V) of at least about 10 and not greater than about 250. Preferred such ratios range from about 15 to 50. The amount of halogenated organic promoter used with respect to the vanadium compound may generally range in the promoter/V molar ratio of between about 5 to about 250. It is desirable that the promoter/V ratio be not substantially higher than the Al/V ratio, and preferred ratios range from about 5 to about 50.

This invention is further illustrated by the following examples In Examples 1-14, polymerizations were conducted in a 1 liter volume continuous flow, stirred tank reactor. Feeds to the reactor were purified to remove water and other polar impurities that could act as catalyst poisons. Ethylene and propylene were metered through calibrated rotameters into a stream of hexane solvent which was pumped at a known rate with a metering pump. This mixture then entered a heat exchanger which lowered the temperature to about −20° to −10° C. to prechill the feed prior to reaction and to dissolve the monomers in the hexane. The cold stream leaving the heat exchanger then entered the reactor. Catalyst, cocatalyst, promoter, and diene monomer were prepared as dilute solutions in hexane and each was pumped separately into the reactor via metering pumps. $H_2$ was also added to the reactor to control polymer molecular weight, and in some cases $NH_3$ was added to suppress any tendency for long chain branching. Temperature in the reactor was controlled by circulating water through a jacket. Iso-propyl alcohol was added to the polymer solution exiting the reactor to terminate polymerization, and the solution was added to boiling water to remove solvent and monomers. The wet polymer was then dried on a hot rubber mill to yield the final product. Polymerization rate was measured by determining the weight of polymer produced in a fixed period of time.

Polymer ethylene content was determined by ASTM D3900. Ethylidene norbornene content was measured by infrared based on the height of the 1690 $cm^{-1}$ band. Mooney viscosity was determined by ASTM D1646. The compositional distribution (CD) and molecular weight distribution (MWD) of the polymer were determined as described above.

Specifically, the CD was determined by cutting a sample of the finished copolymer into small pieces and adding the pieces to hexane to give a concentration of about 1 g/100 cc. This mixture was then stirred gently at 22° C. for 48 hours, or until equilibrium is reached. The mixture is then poured through a fine mesh stainless steel screen to recover any insoluble polymer, which is dried, weighed and analyzed for composition. Isopropanol is then slowly added to the solution until precipitated polymer first appears. This polymer is recovered on a screen, dried, weighed and also analyzed for composition. Additional isopropanol is added incrementally to the remaining solution to precipitate four to six fractions in total, all of which are recovered as described previously. The final isopropanol-hexane solution is then evaporated to dryness to yield a final polymer fraction. From the weight of each fraction and its ethylene and termonomer (if any) composition, a plot is prepared of weight percent composition vs cumulative weight percent polymer as described above and as illustrated in FIG. 1.

EXAMPLE 1

A polymerization was conducted by the process described above with a VCl$_4$-triethyl aluminum (TEA) catalyst system with CCl$_4$ as a promoter at a temperature of 75° C. NH$_3$ was also added to the reactor at a NH$_3$/V molar ratio of 1:1. Hexane feed rate was 2500 g/hr. All other polymerization conditions are given in Table 1. The polymerization went smoothly giving high monomer conversion and high catalyst activity.

Polymer fractionation by the process described above gave the cumulative composition curve shown in FIG. 1. Polymer species were present that ranged from at least 65.5 wt% ethylene to at least 35.5 wt% ethylene. From this figure it can be determined that about 44% the polymer had an ethylene content 5% higher than the mean of 50%, while about 41% of the polymer had an ethylene content 5% less than the mean. Thus, the CD of this polymer is 85%. Mw/Mn for this polymer was 3.0.

EXAMPLE 2

This example illustrates the use of the VOCl$_3$/TEA catalyst system with CCl$_4$ promoter at a polymerization temperature of 75° C. NH$_3$ was added to the reactor at NH$_3$/V molar ratio of 1:1. Hexane flow rate was 2500 g/hr. As shown in Table 1., catalyst activity was high and monomer conversions were good. About 65% of the polymer has an ethylene content ±5% greater than the mean value. Mw/Mn for this polymer was 3.8.

EXAMPLE 3

Polymerization was attempted with a VOCl$_3$/diethylaluminum chloride (DEAC) catalyst system at 75° C. according to the conditions in Table 1 with a hexane feed of 2500 g/hr. Very poor polymerization resulted giving large amounts of insoluble polymer and low polymerization rates. The DEAC feed was replaced by an equal molar feed of TEA. Polymerization rates began to improve and the insoluble polymer disappeared. After allowing the reactor to reach steady state, high polymerization rate and good monomer conversion was measured as shown in Table 1.

EXAMPLE 4

This run illustrates the use of benzyl chloride as a promoter with the VCl$_4$/TEA catalyst system. Benzyl chloride has a Cooper reactivity index of 0.05. An NH$_3$/V molar ratio of 1:1 was used and the hexane flow rate was 2500 g/hr. The composition distribution of the polymer was such that 64 wt% of the polymer has an ethylene content ±5% greater than the mean value. Mw/Mn for the polymer is 3.1.

EXAMPLE 5 (A,B,C,D)

This example illustrates the use of various promoters with the VOCl$_3$/TEA catalyst system at 75° C. polymerization temperature. The hexane feed rate was 2500 g/hr and the other polymerization conditions are as shown in Table 1. The promoters used are indicated below:

| Example | Promoter | Cooper Reactivity Index |
|---|---|---|
| 5A | Benzyl bromide | .1 |
| 5B | 2,3 Dichloropropylene | .02 |
| 5C | 1,3 Dichloropropylene | .02 |
| 5D | Hexachloroethylene | 5 |

As shown by the results in Table 1 all of these promoters gave good catalyst activity and monomer conversion.

COMPARATIVE EXAMPLE 6

An attempt was made to conduct a polymerization with the VOCl$_3$-TEA catalyst system and benzoyl chloride as the promoter at conditions similar to those used in Example 5. Benzoyl chloride has a Cooper Index of 40. Large amounts of insoluble polymer were produced and steady-state operating data could not be obtained.

TABLE 1

| EXAMPLE | TEMP °C. | RES. TIME MINS. | FEEDS | | | VANDIUM CATALYST M.MOL/HR | PROMOTOR/V MOLAR RATIO | AL/V MOLAR RATIO |
| | | | ETHYLENE g./HR | PROPYLENE g./HR | DIENE g./HR | | | |
|---|---|---|---|---|---|---|---|---|
| 1 | 75 | 14 | 75 | 150 | 8 | .30 | 30 | 40 |
| 2 | 75 | 14 | 75 | 150 | 7 | .30 | 30 | 30 |
| 3 | 75 | 14 | 75 | 200 | 0 | .33 | 18 | 17 |
| 4 | 75 | 14 | 120 | 260 | 13 | .51 | 33.5 | 22 |
| 5A | 75 | 14 | 75 | 150 | 0 | .30 | 20 | 30 |
| 5B | 75 | 14 | 75 | 150 | 0 | .30 | 20 | 30 |
| 5C | 75 | 14 | 75 | 150 | 0 | .30 | 20 | 30 |
| 5D | 75 | 14 | 75 | 150 | 0 | .30 | 32.5 | 42.5 |
| 6 | | | | | (NO DATA) | | | |
| 7A | 75 | 14 | 75 | 150 | 0 | .33 | 9.8 | 16.6 |
| 7B | 75 | 14 | 75 | 150 | 0 | .33 | 21.3 | 36.0 |
| 7C | 75 | 14 | 75 | 150 | 7 | .33 | 9.5 | 18.9 |

| EXAMPLE | H$_2$ FEED MMOL/HR | RATE OF COPOLYM. g./HR | CAT. EFF. g.EP/ MMOL V | CONVERSION | | | POLYMER COMPOSITION | | MOONEY VISC. 100° C. 1 + 8 | Mw/Mn |
| | | | | C$_2$ WT % | C$_3$ WT % | ENB WT % | C$_2$ WT % | ENB WT % | | |
|---|---|---|---|---|---|---|---|---|---|---|
| 1 | 1.3 | 127 | 423 | 78 | 43 | 51 | 47.7 | 3.2 | 50 | 3.0 |
| 2 | 1.9 | 106 | 353 | 77 | 29 | 47 | 56.7 | 3.1 | 66 | 3.8 |
| 3 | 6.1 | 123 | 372 | 75 | 33 | — | 45.7 | — | — | — |
| 4 | 1.9 | 145 | 284 | 63 | 25 | 30 | 53.5 | 2.7 | 57 | 3.1 |
| 5A | 4.7 | 94 | 313 | 64 | 31 | — | 51.0 | — | 36 | 5.8 |
| 5B | 4.7 | 94 | 313 | 63 | 31 | — | 49.9 | — | 32 | 4.3 |
| 5C | 4.7 | 110 | 367 | 65 | 41 | — | 44.2 | — | 31 | 4.2 |
| 5D | 4.7 | 110 | 367 | 76 | 38 | — | 52.0 | — | 18 | 3.8 |
| 6 | | | | (NO DATA) | | | | | | |

TABLE 1-continued

| | | | | | | | | | | |
|---|---|---|---|---|---|---|---|---|---|---|
| 7A | 0 | 130 | 390 | 85 | 44 | — | 49.3 | — | 42 | — |
| 7B | 0 | 136 | 408 | 90 | 45 | — | 49.9 | — | 34 | 80 |
| 7C | 0 | 68 | 204 | 59 | 14 | 24 | 67.4 | 2.5 | 57 | 8.0 |

COMPARATIVE EXAMPLE 7 (A, B, D)

In this example, trichlorotoluene was used as a promoter with the $VOCl_3$-TEA catalyst system. Trichlorotoluene has a Cooper Index of 40. Polymerization conditions and results are shown in Table 1. Hexane feed rate was 2500 g/hr. In the copolymerization runs, 7A and 7B, catalyst activity was very high. GPC analysis of the copolymer produced in run 7B indicated a broad, bimodal MWD, with a low MW mode shifted to a Mn of 251 and a high MW mode with an Mn of 31,000. Mw/Mn for polymer 7B was 80. Introduction of ENB into the polymerization in run 7C, which is at conditions otherwise similar to 7A, caused catalyst activity and monomer conversion to drop substantially relative to 7A. GPC analysis of this polymer showed a single broad peak and Mw/Mn was 8.0. The compositional distribution for the polymer mode in Example 7C is broad with 37% of the polymer greater than ±5% ethylene of the mean.

EXAMPLE 8 (A,B,C,D)

A series of terpolymerization runs were carried out with the $VOCl_3$-triisobutyl aluminum (TIBA) catalyst system at different $CCl_4/V$ and Al/V ratios. A $NH_3/V$ ratio of 1.0 was used and the hexane feed rate was 2500 g/hr. As shown by the results in Table 2, catalyst activity was good over the entire range of conditions tested.

EXAMPLE 9

Vanadium tris-hexanoate was prepared by reacting $VCl_3$ with hexanoic acid. A terpolymerization was carried out with this catalyst and TEA cocatalyst with $CCl_4$ as the promoter. Polymerization results are shown in Table 2. Hexane feed rate was 3030 g/hr and a $NH_3/V$ ratio of 0.65 was used. The compositional distribution was broad with 77% of the polymer greater than ±5 wt% ethylene from the mean. Mw/Mn was 4.3.

EXAMPLE 10 (A,B,C)

This run was made with varying levels of $CCl_4$ promoter and the $VCl_4$-TEA catalyst system. The hexane flow rate was 2500 g/hr and the $NH_3/V$ ratio was 1.1. In examples 10A through 10C in Table 2, the $CCl_4/V$ ratio was reduced from 20/1 to 1.67/1. As shown by the results in the Table, polymerization rates are reduced considerably when insufficient $CCl_4$ is present and Mw/Mn goes up as $CCl_4/V$ is reduced. The compositional distributions for polymers 10B and 10C are broad. For polymer 10B, 90% of the polymer has a composition greater than ±5 wt% ethylene from the mean, while for polymer 10C, 87% of the polymer differs from the mean by greater than ±5 wt% ethylene.

EXAMPLE 11

This run was made to demonstrate polymerization with the $VCl_4$/trinormal hexyl aluminum catalyst system and $CCl_4$ promoter. Hexane feed rate was 3030 g/hr. As shown by the results in Table 2, high catalyst activity was obtained. The polymer had an Mw/Mn value of 4.5 and the CD was broad with 79% of the polymer differing from the mean ethylene content by greater than 5 wt% ethylene.

EXAMPLE 12 (A,B,C,D)

This run was made to investigate the effect of $NH_3$ on the polymerization with the $VCl_4$/TEA catalyst system and $CCl_4$ as a promoter. Hexane feed rate was 2500 g/hr. In runs A through D, increasing amounts of $NH_3$ were added to the reactor. After each change in $NH_3$ feed, the reactor was allowed to reach steady state and a sample was taken to determine polymerization rate and polymer properties As shown by the results in Table 2, $NH_3$ has no effect on polymer composition or Mooney viscosity until a level of 13.6 mole/mole V was reached in run D at which point a decrease in catalyst activity occurred. Mw/Mn stayed constant at about 3.4 for this series of runs. 70% of the polymer differed from the mean ethylene content by at least ±5 wt% ethylene in Run C, and 66% of the polymer differed from the mean ethylene content by at least ±5 wt% ethylene in Run D. The lack of effect of $NH_3$, a long chain branching suppressor, on Mooney viscosity or $M_w/M_n$ indicates that the catalyst system of this invention produces polymers with a low branching level.

EXAMPLE 13

Vanadium chloride bis hexanoate was prepared by the reaction of $VCl_3$ with 2 moles of hexanoic acid. A polymerization was carried out with this catalyst and TEA cocatalyst with $CCl_4$ as the promoter. As shown by the results in Table 2, catalyst activity was good. The polymer had an Mw/Mn of 4.0 and 72% of the polymer differed from the mean composition by greater than ±5 wt% ethylene.

TABLE 2

| EX- AMPLE | TEMP. °C. | RES. TIME MINS. | FEEDS | | | VANADIUM CATALYST MMOL./HR | PROMOTOR/V MOLAR RATIO | AL/V MOLAR RATIO |
|---|---|---|---|---|---|---|---|---|
| | | | ETHYLENE g./HR | PROPYLENE g./HR | DIENE g./HR | | | |
| 8A | 75 | 14 | 75 | 150 | 7 | .33 | 28 | 28 |
| 8B | 75 | 14 | 74 | 150 | 7 | .33 | 14 | 38 |
| 8C | 75 | 14 | 75 | 150 | 7 | .33 | 14 | 18 |
| 8D | 75 | 14 | 75 | 150 | 8.2 | .38 | 24 | 16 |
| 9 | 75 | 12 | 120 | 200 | 14 | .90 | 30 | 30 |
| 10A | 75 | 14 | 75 | 150 | 8 | .30 | 20 | 20 |
| 10B | 75 | 14 | 75 | 200 | 8 | .30 | 3.3 | 20 |
| 10C | 75 | 14 | 75 | 200 | 8 | .30 | 1.7 | 20 |
| 11 | 75 | 12 | 120 | 200 | 14 | .80 | 20 | 30 |
| 12A | 75 | 14 | 75 | 150 | 8 | .33 | 18 | 29 |
| 12B | 75 | 14 | 75 | 150 | 8 | .33 | 18 | 29 |

TABLE 2-continued

| EX-AMPLE | H₂ FEED MMOL./HR | RATE OF COPOLYM. g./HR. | CAT. EFF. EP/ MMOL V | CONVERSION C₂ WT % | CONVERSION C₃ WT % | CONVERSION ENB WT % | POLYMER COMPOSITION C₂ WT % | POLYMER COMPOSITION ENB WT % | NH₃/V MOLAR RATIO | MOONEY VISC. 100° C. 1 + 8 | Mw/Mn |
|---|---|---|---|---|---|---|---|---|---|---|---|
| 12C | 75 | 14 | 75 | 150 | 8 | .33 | 18 | 29 | | | |
| 12D | 75 | 14 | 75 | 150 | 8 | .33 | 18 | 29 | | | |
| 13  | 75 | 14 | 75 | 150 | 8 | .3  | 30 | 28 | | | |

| EX-AMPLE | H₂ FEED MMOL./HR | RATE OF COPOLYM. g./HR. | CAT. EFF. EP/MMOL V | C₂ WT % | C₃ WT % | ENB WT % | C₂ WT % | ENB WT % | NH₃/V MOLAR RATIO | MOONEY VISC. 100° C. 1 + 8 | Mw/Mn |
|---|---|---|---|---|---|---|---|---|---|---|---|
| 8A  | 3.2  | 93  | 279 | 73 | 23 | 60 | 61.7 | 4.5 | — | 82 | — |
| 8B  | 3.2  | 91  | 273 | 68 | 24 | 54 | 58.8 | 4.2 | — | 75 | — |
| 8C  | 3.2  | 102 | 306 | 75 | 27 | 51 | 51.8 | 3.5 | — | 75 | — |
| 8D  | 3.2  | 92  | 242 | 74 | 22 | 39 | 63.0 | 3.5 | — | 89 | — |
| 9   | 4.7  | 187 | 208 | 78 | 44 | 79 | 51.4 | 4.3 | — | 29[1] | — |
| 10A | 1.07 | 115 | 383 | 65 | 42 | 43 | 43.4 | 3.1 | — | 48 | 3.8 |
| 10B | 1.07 | 100 | 333 | 60 | 26 | 30 | 46.2 | 2.4 | — | 74 | 4.1 |
| 10C | 1.07 | 41  | 157 | 26 | 10 | 15 | 48.1 | 3.0 | — | —  | 5.1 |
| 11  | 3.1  | 184 | 230 | 81 | 39 | 49 | 54.8 | 3.7 | — | 43[1] | 4.5 |
| 12A | 1.07 | 99  | 297 | 65 | 31 | 37 | 51.0 | 3.0 | 1.7 | 42[1] | 3.5 |
| 12B | 1.07 | 97  | 291 | 64 | 31 | 39 | 50.6 | 3.2 | 3.6 | 46[1] | — |
| 12C | 1.07 | 98  | 294 | 63 | 32 | 41 | 49.6 | 3.4 | 6.6 | 40[1] | 3.3 |
| 12D | 1.07 | 77  | 231 | 57 | 21 | 33 | 57.1 | 3.4 | 13.6 | 60[1] | 3.4 |
| 13  | 32   | 106 | 353 | 70 | 32 | 54 | 51.7 | 4.1 | — | 21[1] | 4.0 |

Note:
[1] 125° C. (1 + 4)

EXAMPLE 14 (A,B,C)

This run was made to investigate the effect of reaction temperature on ethylene-propylene copolymerization with the VOCl₃/TEA catalyst system and CCl₄ as promoter. Hexane feed rate was 2500g/hr. Other reaction conditions are shown in Table 3. As indicated by the results in this Table, catalyst activity remains almost constant at polymerization temperatures from 65° to 97° C.

EXAMPLE 15 (A,B,C)

This run was made to investigate the effect of reaction temperature on ENB terpolymerization with VOCl₃/TEA catalyst and CCl₄ promoter. Hexane feed rate was 2500 g/hr and other conditions are shown in Table 3. The results in Table 3 indicate that catalyst performance was unaffected by temperature over the range of 55° to 75° C.

EXAMPLE 16 (A,B)

The polymerization procedure described in Example 15 was used except that the polymerization was carried out in two 7.6 liter volume stirred tank reactors connected in series. Catalyst, solvent and monomers were fed to the first reactor, and the product stream entered the second reactor to which additional monomers dissolved in hexane solvent were added. Polymerization conditions are given in Table 3. The catalyst system was VCl₄/TEA with CCL₄ as promoter. Hexane feed to the two reactors was 29.9 and 4.45 kg/hr respectively. Runs A and B are essentially similar except that additional ethylene was fed to the second reactor in Example 16B.

TABLE 3

| EX-AMPLE | TEMP °C. | RES. TIME MINS. | ETHYLENE g./HR | PROPYLENE g./HR | DIENE g./HR | VANDIUM CATALYST M.MOL/HR | PROMOTOR/V MOLAR RATIO | AL/V MOLAR RATIO |
|---|---|---|---|---|---|---|---|---|
| 14A | 65 | 14 | 75 | 150 | 0 | .30 | 43 | 40 |
| B | 75 | 14 | 75 | 150 | 0 | .30 | 43 | 40 |
| C | 97 | 14 | 75 | 150 | 0 | .30 | 43 | 40 |
| 15A | 75 | 14 | 75 | 200 | 7.7 | .30 | 33 | 30 |
| B | 65 | 14 | 75 | 200 | 7.7 | .30 | 33 | 30 |
| C | 55 | 14 | 75 | 200 | 7.7 | .30 | 33 | 30 |
| 16A REAC. #1 | 60 | 12 | 1015 | 2029 | 299 | .79 | 20 | 30 |
| 16A REAC. #2 | 65 | 11 | 254 | 0 | 93 | 0 | — | — |
| 16B REAC. #1 | 60 | 12 | 1015 | 2029 | 299 | .79 | 20 | 30 |
| 16B REAC. #2 | 65 | 11 | 508 | 0 | 93 | 0 | — | — |

| EX-AMPLE | H₂ FEED MMOL/HR | RATE OF COPOLYM. g./HR | CAT. EFF. g.EP/MMOL V | C₂ WT % | C₃ WT % | ENB WT % | C₂ WT % | ENB WT % | MOONEY VISC. 100° C. 1 + 8 |
|---|---|---|---|---|---|---|---|---|---|
| 14A | 3.2 | 133 | 443 | 81 | 48 | — | 46 | — | 31 |
| B | 3.2 | 142 | 473 | 92 | 49 | — | 48 | — | 28 |
| C | 3.2 | 121 | 403 | 80 | 41 | — | 50 | — | 29 |

TABLE 3-continued

| | | | | | | | | | |
|---|---|---|---|---|---|---|---|---|---|
| 15A | 4.7 | 108 | 360 | 70 | 26 | 36 | 50 | 2.6 | 37 |
| B | 4.7 | 110 | 367 | 71 | 26 | 48 | 50 | 3.4 | 43 |
| C | 4.7 | 109 | 363 | 70 | 26 | 42 | 50 | 3.0 | 43 |
| 16A REAC. #1 | 0 | 1544 | 378 | 70 | 36 | 34 | 54 | 6.7 | 87 |
| 16A REAC. #2 | 0 | 1968 | 482 | 72 | 46 | 32 | 54 | 6.5 | 94 |
| 16B REAC. #1 | 0 | 1544 | 378 | 70 | 36 | 34 | 54 | 6.7 | 87 |
| 16B REAC. #2 | 0 | 2362 | 579 | 75 | 53 | 39 | 56 | 6.5 | 98 |

The results of the polymerization are also shown in Table 3. In this Table, the conversions, catalyst efficiency, polymerization rate, and polymer composition shown for reactor 2 are the cumulative results for operating both reactors in series. As indicated by the data, series reactor operation gives increased catalyst efficiency and ethylene and propylene conversion.

Reasonable variations or modifications of this invention can be made or followed, in view of the foregoing, without departing from the spirit or scope thereof.

What is claimed is:

1. A process for preparing an elastomeric copolymer of ethylene, at least one other alpha-monoolefin having from 3 to 18 carbon atoms, and from 0 to 20% by weight of a non-conjugated diene, said copolymer containing from about 30 to about 85 weight percent of ethylene and from about 15 to 70 weight percent of said other alpha-monoolefin, said copolymer further characterized by a broad intermolecular compositional distribution such that at least about 25% by weight of the copolymer differs from the mean ethylene content of the copolymer by greater than plus or minus 5%, and said copolymer having a molecular weight distribution such that the weight average molecular weight divided by the number average molecular weight as determined by GPC is from about 2 to 5, said process comprising polymerizing a mixture of ethylene and at least one other alpha-monoolefin and, optionally, said non-conjugated diene in solution in the presence of a catalyst and promoter system comprising:

a) A vanadium compound having the formula:

wherein X is halogen, Y is an organic alcoholate, carboxylate, ketonate or diketonate having up to 10 carbon atoms, a may range from 1 to 3 with the sum of a and b being 2 or 3, c may range from 1 to 4 with the sum of c and d being 3 or 4, b) an aluminum compound having the formula $AlR_3$, wherein R is a hydrocarbon radical having from 1 to 10 carbon atoms, and c) a halogenated organic polymerization promoter having a Cooper reactivity index in the range of about 0.01 to 30, the Cooper reactivity index of carbon tetrachloride being 1.0, said vanadium compound, aluminum compound and promoter being separately introduced into the solution to form the catalyst and promoter system in the presence of said ethylene, higher alpha-monoolefin and optional nonconjugated diene.

2. The process of claim 1 wherein said copolymer contains from about 40 to about 80% by weight ethylene and from about 20 to about 60% by weight of said other alpha-monoolefin.

3. The process of claim 1 wherein said other alpha-monoolefin is propylene.

4. The process of claim 1 wherein said copolymer contains at least about 1% by weight of said non conjugated diene.

5. The process of claim 4 wherein said non-conjugated diene is selected from the group consisting of straight chain acyclic dienes, branched chain acyclic dienes, multi ring alicyclic fused and bridged ring dienes, and single ring alicyclic dienes.

6. The process of claim 5 wherein said copolymer contains from about 1 to about 10% by weight of said non-conjugated diene.

7. The process of claim 6 wherein said non conjugated diene is 5-ethylidene-2-norbornene.

8. The process of claim 1 wherein at least about 50% by weight of the copolymer differs from the means ethylene content of copolymer by greater than plus or minus 5%.

9. The process of claim 1 wherein said halogenated promoter is selected from the group consisting of carbon tetrachloride, hexachloroethylene, benzyl bromide, benzyl chloride and 2,3- or 1,3-dichloropropylene.

10. The process of claim 9 wherein said halogenated promoter is carbon tetrachloride.

11. The process of claim 9 wherein said halogenated promoter is benzyl chloride.

12. The process of claim 9 wherein said halogenated promoter is benzyl bromide.

13. The process of claim 9 wherein said halogenated promoter is hexachloroethylene.

14. The process of claim 9 wherein said halogenated promoter is 2, 3- or 1, 3- dicholoropropylene.

15. The process of claim 1 wherein the vanadium compound is present in the reaction solvent at a level of from about 0.02 to about 0.5 millimoles per liter of solvent.

16. The process of claim 15 wherein the vanadium compound is present in the reaction solvent at a level greater than 0.05 millimoles per liter of solvent..

17. The process of claim 15 wherein said aluminum trialkyl compound is present at a level such that the aluminum to vanadium molar ratio ranges from about 10 to about 250, and said halogenated promoter is present at a level such that the molar ratio of promoter to vanadium ranges from about 5 to about 250.

18. The process of claim 15 wherein said polymerization is conducted at a temperature within the range of about 10° to about 140° C.

19. The process of claim 18 wherein said polymerization is conducted at a temperature within the range of about 40° to about 120° C.

20. The process of claim 18 wherein said polymerization is conducted at a temperature within the range of about 55° to 100° C.

21. The process of claim 15 wherein said vanadium compound is selected from the group consisting of $VOCl_3$, $VCl_4$ and $VOCl_2(OR)$ wherein R is a hydrocarbon radical having from 1 to 10 carbon atoms.

22. The process of claim 1 wherein said aluminum compound is triethyl, triisobutyl or tri n-hexyl aluminum.

23. The process of claim 15 wherein said polymerization is conducted in the presence of a chain transfer agent.

24. The process of claim 15 wherein said polymerization is conducted in the presence of a chain branching suppressor.

25. The process of claim 1 conducted in at least one continuous flow stirred tank reactor.

26. The process of claim 1 wherein at least about 40% by weight of the copolymer differs from the mean ethylene content of the copolymer by greater than plus or minus 5%.

* * * * *